March 17, 1970  D. FIELD  3,500,611
MOIST PACKAGED ARTICLE AND EQUIPMENT FOR MAKING SAME
Filed Aug. 26, 1966  6 Sheets-Sheet 1

INVENTOR.
DONALD FIELD
BY
ATTORNEY

March 17, 1970

D. FIELD 3,500,611

MOIST PACKAGED ARTICLE AND EQUIPMENT FOR MAKING SAME

Filed Aug. 26, 1966

INVENTOR.
DONALD FIELD

BY

*Arthur B. Colvin*

ATTORNEY

United States Patent Office 3,500,611
Patented Mar. 17, 1970

3,500,611
MOIST PACKAGED ARTICLE AND EQUIPMENT FOR MAKING SAME
Donald Field, Trenton, N.J., assignor, by mesne assignments, to Holland-Rantos Company, Inc., Piscataway, N.J., a corporation of New Jersey
Filed Aug. 26, 1966, Ser. No. 575,369
Int. Cl. B65b 1/02, 63/04, 3/04
U.S. Cl. 53—183   4 Claims

ABSTRACT OF THE DISCLOSURE

Apparatus for forming a sealed packet containing a fluid saturated pad including means for forming a three sided, open envelope from heat sealable material, means for advancing the envelope to a puffer station, means for inserting a folded, moisture absorbent segment into said packet, means for saturating the moisture absorbent segment and means for thereafter sealing the open mouth portion of the packet.

---

This invention relates to a packet forming and stuffing machine, and more particularly to a device for forming sealed packets containing a moist article, such as a towel of paper, fibers, fabric or the like, saturated with cleansing material, lotion or the like.

Still more particularly this invention relates to an improved apparatus for forming packets of the type described which provides higher output, fewer rejects or improperly formed packets and, in general, provides an improved apparatus as contrasted with devices of this sort previously known.

It is therefore an object of this invention to provide an improved device for forming and filling sealed packets for moist articles and the like.

It is a further object of the invention to provide a device of the class described having novel packet forming means for assuring the formation of perfectly defined packet structures.

A further object of the invention is the provision of an improved device of the class described including improved filling means, permitting the packets to be charged with a maximum of material without fear of distortion, rupture or other compromise of the formed packet.

Still a further object of the invention is the provision of a device of the class described having novel means for feeding and forming the package filler material and advancing the same into the packet prior to saturation thereof.

Still a further object of the invention is the provision of a reliable, high capacity device for performing all of the objects heretofore set forth.

To attain these objects and such further objects as may appear herein or be hereinafter set forth, reference is made to the accompanying drawings, forming a part hereof, in which.

Figure 1:
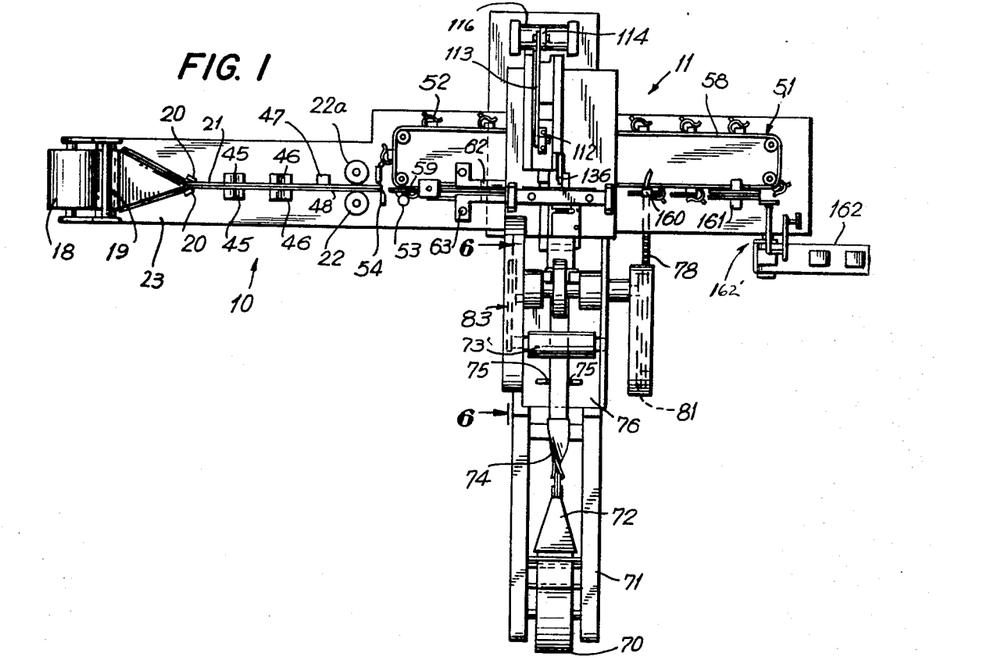
FIG. 1 is a plan view of a packet forming and filling apparatus of the type described.
Figure 2:
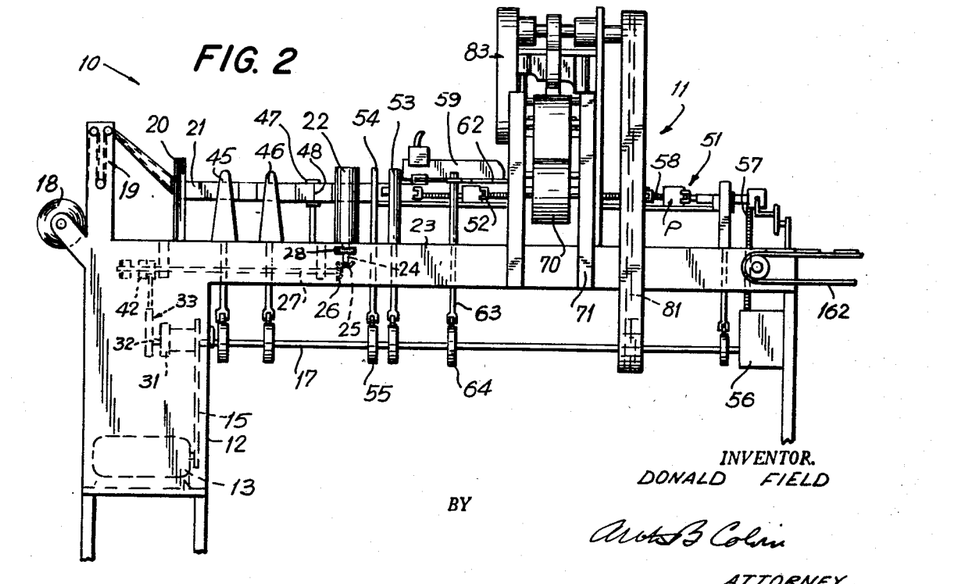
FIG. 2 is a side elevational view of the apparatus of FIG. 1.

Reference will now be made to FIGS. 1 and 2 of the drawings wherein the apparatus of the present invention is generally shown as incorporating a packet forming section 10 and a packet filling section 11.

Referring to the packet forming section 10, best shown in FIGS. 1, 2, 8 and 9, there is mounted on framework 12 a drive motor 13 which carries drive sprocket 14 connected by chain 15 to main sprocket 16 keyed to the longitudinally extending main drive shaft 17. The drive shaft 17 extends longitudinally of the apparatus and a multiplicity of power take-off members are powerized by the shaft 17.

A bulk web supply 18 is rotatably mounted on the framework 12, the web of said supply comprising an impervious strip, preferably of foil coated with polyethylene or like heat sealable plastic material.

The web from the supply roll 18 is led over web tensioning apparatus 19 and under and between spaced parallel web guide members 20, 20 which fold the web in half about its longitudinal axis to a generally trough-like conformation.

The folded in half web 21 passes between web drive roller 22, 22a spaced from the guide members 20, 20, the rollers 22, 22a functioning to advance the web 21 in a series of stop and start movements through the medium of web feed apparatus next to be described.

The drive rollers 22, 22a are journalled in bearings formed through the flat bed 23 of the frame. Driver roller 22 is provided with a downwardly directed shaft 24, carrying at its lower end bevel gear 25. Bevel gear 25 is meshed with a mating bevel gear 26 mounted on the end of intermittently driven web advance shaft 27. The roller 22a, in the illustrated embodiment, is driven by a gear (not shown) which meshes with the driven gear 28 carried on the shaft 24, it being understood that under certain circumstances satisfactory results may be obtained where the roller 22a is an idler roller. Intermittently driven shaft 27 is journalled between spaced bearings 29, 30 depending from the bed plate 23.

Figures 8, 9, 10:
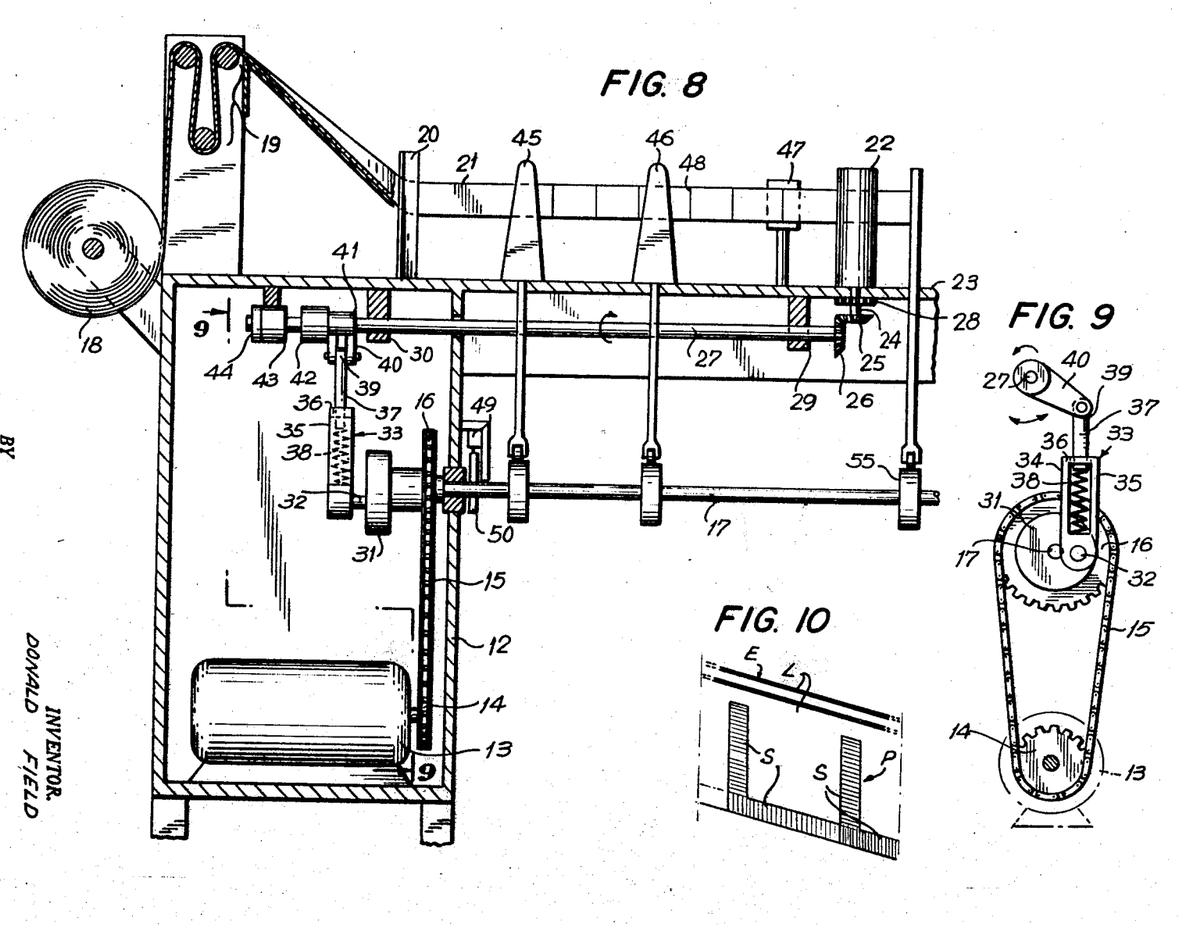
FIG. 8 is a vertical sectional view on an enlarged scale of the packet forming component of the apparatus.
FIG. 9 is a sectional view taken on the discontinuous line 9—9 of FIG. 8.
FIG. 10 is a perspective view of a series of partly formed envelope members.

To the main drive shaft 17 there is mounted a flywheel 31 carrying an eccentric pin 32. A yoke 33 is pivotally connected to the pin 32, the yoke having a pair of spaced legs 34, 35 joined by end portion 36, see FIG. 9. The end portion 36 is apertured and slidably receives drive rod 37, which is shiftable axially within the yoke in the space defined between the legs 34, 35. The rod 37 is shouldered at the end portion between the yoke legs so that it cannot pass outwardly beyond the aperture, a spring 38 normally pressing the rod 37 to its outermost position within the yoke, as shown in FIG. 9.

The end 39 of the rod 37 is pivotally connected to a link arm 40. The other end of the arm 40 is made fast to one element 41 of a one-way clutch, the second element 42 of said clutch being keyed to the intermittent web feed shaft 27. An electric brake member 43 is mounted beneath the bed plate 23, the brake member having a rotor element 44 which is likewise keyed to the shaft 27.

The brake 43 is of the instant activated type whereby, on completion of a circuit through the brake, the elements 43, 44 are locked against relative rotation.

From the foregoing it will be recognized that when the brake is in the locked position, further rotation of the shaft 27 will be impossible and, accordingly, the drive rollers 22, 22a will no longer feed web material.

As will best be seen from FIG. 9, rotation of the fly wheel 31 will drive the link 40 back and forth in an arcuate path. Thus, but for the provision of one-way clutch 41, 42, the shaft 27 (when not disabled by the brake 43) would be rocked back and forth rather than rotated in a single direction. The undesirable rocking movement is avoided by the provision of the clutch 41, 42 which permits relative movement between the noted elements when the eccentric mechanism would drive the shaft in a clockwise direction (when viewed in the orientation of FIG. 9), but coupled said elements when the shaft is driven in a counterclockwise direction, as shown by the arrows, FIGS. 8 and 9.

As noted above, the shaft 27 will at times be frozen against rotation by the brake 43, the over-travel provided by the slip fit of the rod 37 and the yoke 33 permitting continuous rotation of the main shaft 17, notwithstanding the locked position of the intermittent shaft 27. In the unlocked position of the brake, the rod 37 and yoke 33 act essentially as a single lever due to the action of the spring 38.

The device is provided with opposed sets of heat seal forming elements 45, 45; 46, 46, which are driven from the main shaft 17. The sealer elements 45, 46 operate in known manner to form heat seals between the opposed web walls, and are cyclically shifted against the sides of the web while it is in the stopped position. As the sealing elements must contact the web only while it is in its stopped position, means are provided to coordinate the advancing movements of the web with the inward movements of the sealer elements. In accordance with the illustrated embodiment, such coordinating means comprises a photo-electric cell member 47 of known type, which controls the brake member 43 to lock the shaft 27 as periodically spaced registration indicia or markings 48 provided along the length of the foil pass a predetermined position adjacent the cell 47.

It will be understood that as the registration indicia or markings 48 (which typically take the form of dark areas) pass the cell, the supply of reflected light from a light source is momentarily interrupted, triggering an actuator circuit of known design which, in turn, instantly activates the brake 43.

During the period of activation of the brake 43, the sealers, as previously noted, form the side and bottom seal areas S, S, FIG. 10. Microswitch means 49 activated by a cam 50 carried by the continuously rotating main shaft 17 operate to release or deactivate the brake 43 as the sealer members 45, 46 begin to move away from contact with the web, thus permitting a further stepped driving movement of the rollers 22.

It is a feature of the invention that the seal members 45, 46 form side seal areas S, which terminate short of the uppermost edges E of the web (see FIG. 10). By this means, lip areas L disposed adjacent the upper edges of the partly sealed web are formed, the lip areas remaining free of connection with each other. The provision of such unconnected lip areas permits the more efficient filling of the packets by the filling mechanism 11 in a manner which will become apparent from the description of such mechanism.

The still connected packets are advanced by the drive rollers 22 to a gripper mechanism 51 comprising an endless chain intermittently driven by mechanism hereinafter described and carrying a series of packet holding clips 52. The packet holding spring clips 52 are sequentially and in stepped, timed relation to the intermittently fed web, shifted past a cam station 53 which engages an arm 53' rigid with the clip 52 and cams the clips open in position to receive the leading edge of the forwardmost packet, the clips 52 closing and gripping said edges as they pass the station 53. A reciprocating knife member 54, driven from an eccentric 55 mounted on the constantly rotating shaft 17 severs the packets in the areas which register with the side seals S, it being understood that the operation of the knife mechanism is timed to coincide with the stop position of the web driving rollers 22. The packets P, after severance from the web, are advanced to the filling mechanism, the grip between the clamps and the packet taking place at a position on leading seal S of the packet beneath the uppermost edges E of the web so as to leave the lip areas free.

The conveyer member 51 is driven in intermittent start and stop steps by a Geneva drive 56, FIG. 2, powered by the main drive shaft 17, a chain 57 connecting the Geneva drive mechanism proper to the conveyer 51. As the packets P are advanced by increments by the conveyer 51 which incorporates drive chain 58, the lip portions L of the packets are guided on opposite sides of a vertically directed spreader plate 59.

Figure 5:
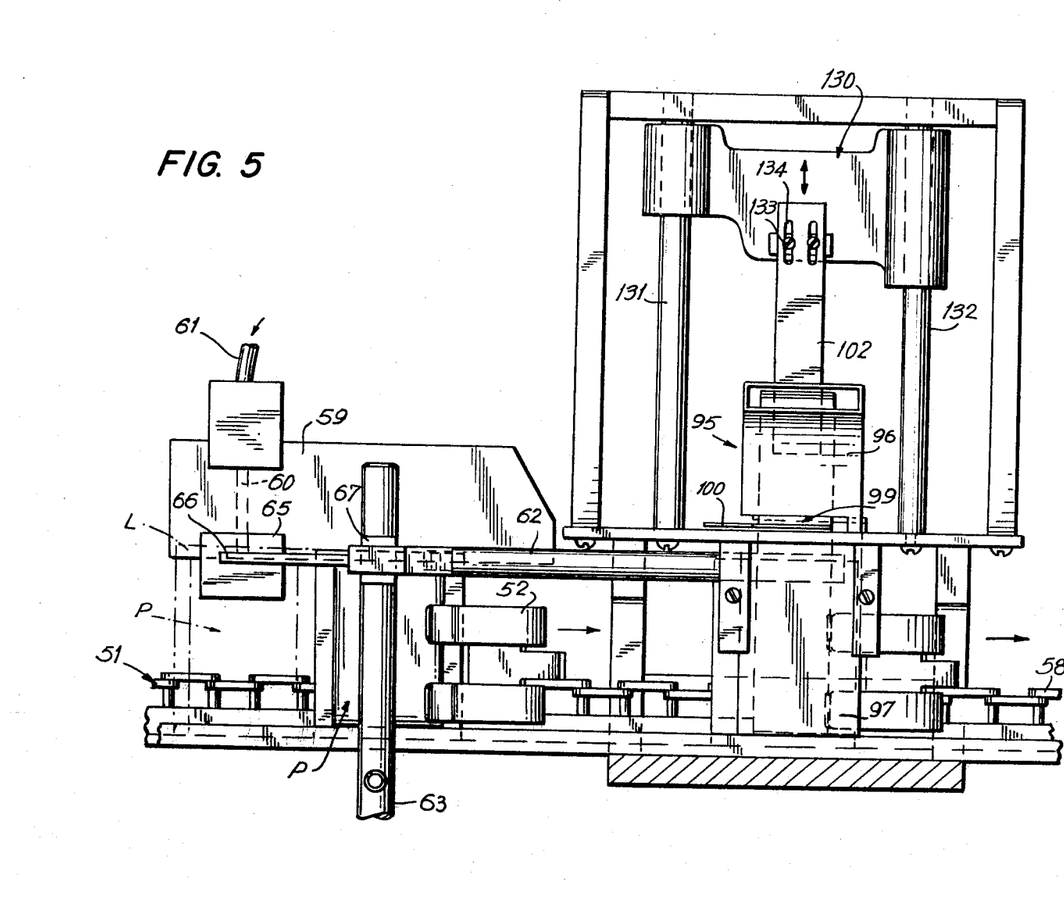
FIG. 5 is a side elevational view on an enlarged scale of packet filling portions of the device.

The plate 59 is recessed to define a central aperture 60, see FIG. 5, opening at the lowermost edge of the plate, the aperture 60 being connected at its upper end to a puffer 61 for feeding air under pressure to the aperture. The conveyer 51 is timed in its stop and start movements to arrest the advance of the packets P at a point at which a packet is aligned with the aperture 60.

An opposed pair of guide or clamp rods 62, 62, see FIGS. 1, 2 and 5, extend longitudinally in parallelism with the plate 59, the rods being mounted for lateral movement in a horizontal plane toward and away from the sides of the plate 59. The rods are operated to their spreading and clamping positions by a power takeoff 63 engaging eccentric 64, see FIG. 2, carried by the constantly driven shaft 17. In the illustrated embodiment of the invention, the power takeoff member 63 is shifted sequentially upwardly and downwardly and carries cam means 67 (FIG. 5) which spread the guide rods 62, 62 outwardly during an upward movement of the member 63, spring means (not shown) being provided to return the rods inwardly toward the plate 59. Any other suitable spreader means may be substituted for the members 63, 67.

The rods 62 are timed in their oscillatory movement with respect to the conveyer 51 so that in the stopped position of the conveyer, the rods are shifted inwardly toward the plate 59, the rods being cammed away from such plate prior to the initiation of the start movement of the conveyer 51.

A pair of clamp pads 65 are fixed to the ends 66 of the rods 62, the pads being disposed in registry with the air aperture 60 formed through the plate 59. As best shown by the dot and dash lines, FIG. 5, the pads 65 press the upwardly extending lips L of the packets toward the opposed sides of the plate 59 so that when air under pressure is applied through the fitting 61 to the aperture 60, the envelopes or packets are puffed outwardly to expand the same and thus facilitate the insertion of the filler web pad.

The device of the present invention prepares filler web pads, such as folded towelling pads, severing the same from an extended roll into strips or increments, folding the increments and stuffing the folded increments into the open-mouthed packets in the filler segment 11 of the device.

Figures 6, 7:
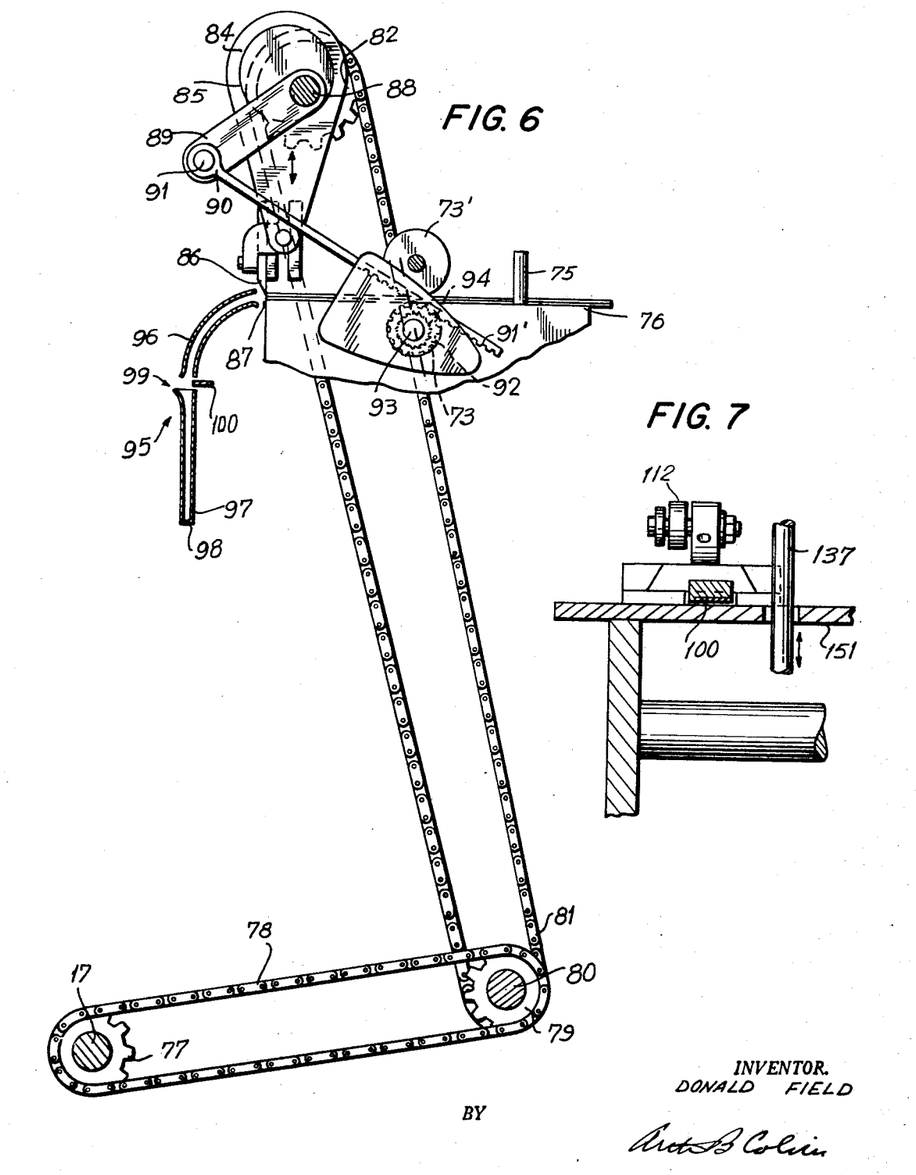
FIG. 6 is a diagrammatic view of the filler web severing device.
FIG. 7 is a section taken on the line 7—7 of FIG. 4.

The apparatus for forming the pad increments is best shown in FIGS. 1, 2 and 6. As seen in FIG. 1, a bulk supply roll 70 of absorbent pad forming material such as paper, or cloth, for example, is mounted on the framework 71. The towelling passes through a fan folding apparatus 72 of the type which is illustrated in co-pending application Ser. No. 297,436, filed July 24, 1963, now Patent No. 3,286,435, and owned by the assignee of this application.

The fan folding assembly serves to form a longitudinal fold or folds in the material fed from the bulk supply 70, the thus formed multiple layers being fed beneath the intermittently operated filler drive roll 73 to the cutter mechanism. The folded filler material, in the illustrated embodiment, is passed through a twist chute 74 and between a spaced pair of guide pins 75, 75, laterally adjustably mounted on guide plate 76, the pins serving to center the folded filler material.

The filler driver roll 73 is advanced by increments from the power take-off mechanism driven from the main shaft 17. For this purpose, a sprocket 77 is connected by chain 78 to an offset sprocket 79 mounted on offset shaft 80, see FIG. 6. A second sprocket (not shown) mounted on the shaft 80 drives chain 81, which chain is meshed at its upper end with sprocket 82 supported for rotation within a cutter housing 83.

An adjustable cutter member 84 is mounted for up and down movement within the housing. An eccentric cam 85 rotates with the sprocket 82, an inturned shoulder portion of the cutter assembly being downwardly biased by spring means (not shown) to ride against the uppermost surface of the cam 85.

From the foregoing it will be seen that rotation of the sprocket 82 carrying the eccentric 85 causes the cutter assembly 84 to oscillate upwardly and downwardly under the biasing influence of the spring, thus causing the adjustable knife blade 86 to be shifted upwardly and downwardly across the anvil portion 87 formed at the end of the plate 76. The driver roll 73 is rotated in an advancing direction by a power take-off extending from an eccentric pin 88, which likewise rotates with the sprocket 82.

A link arm 89 affixed to the pin 88 carries a rack member 90 pivotally mounted on pin 91 supported on the link arm in a position remote from the eccentric pin 88. The rack member 90 includes a toothed portion 91 which meshes with a pinion gear 92 surrounding the shaft 93 of the drive roll 73. One-way clutch or ratchet assembly 94 is interposed between the pinion gear 92 and the shaft 93, the clutch or ratchet arrangement permitting a rotation of the shaft 93 and, hence, the drive roll 73, in an advancing direction only of the filler web (counterclockwise as viewed in FIG. 6). The filler web is pressed between drive roll 73 and idler roll 73′, and it will thus be seen that the constantly driven chain 81 causes an upward and downward oscillating movement of the knife 86 and a stepped drive or feed movement of the web advancing drive roll 73.

The severed filler web increments are advanced into a blind chute assembly 95 having a curved upper portion 96 and a straight bottom portion 97, the chute including a lowermost stop portion 98 for accurate positioning of the filler web segments by engagement with the lead edge thereof.

The chute segments 96, 97 are spaced apart in the central area 99 for purposes of permitting the segments to be shifted out of the chute and folded in the filler web processing apparatus next to be described.

Figure 3:
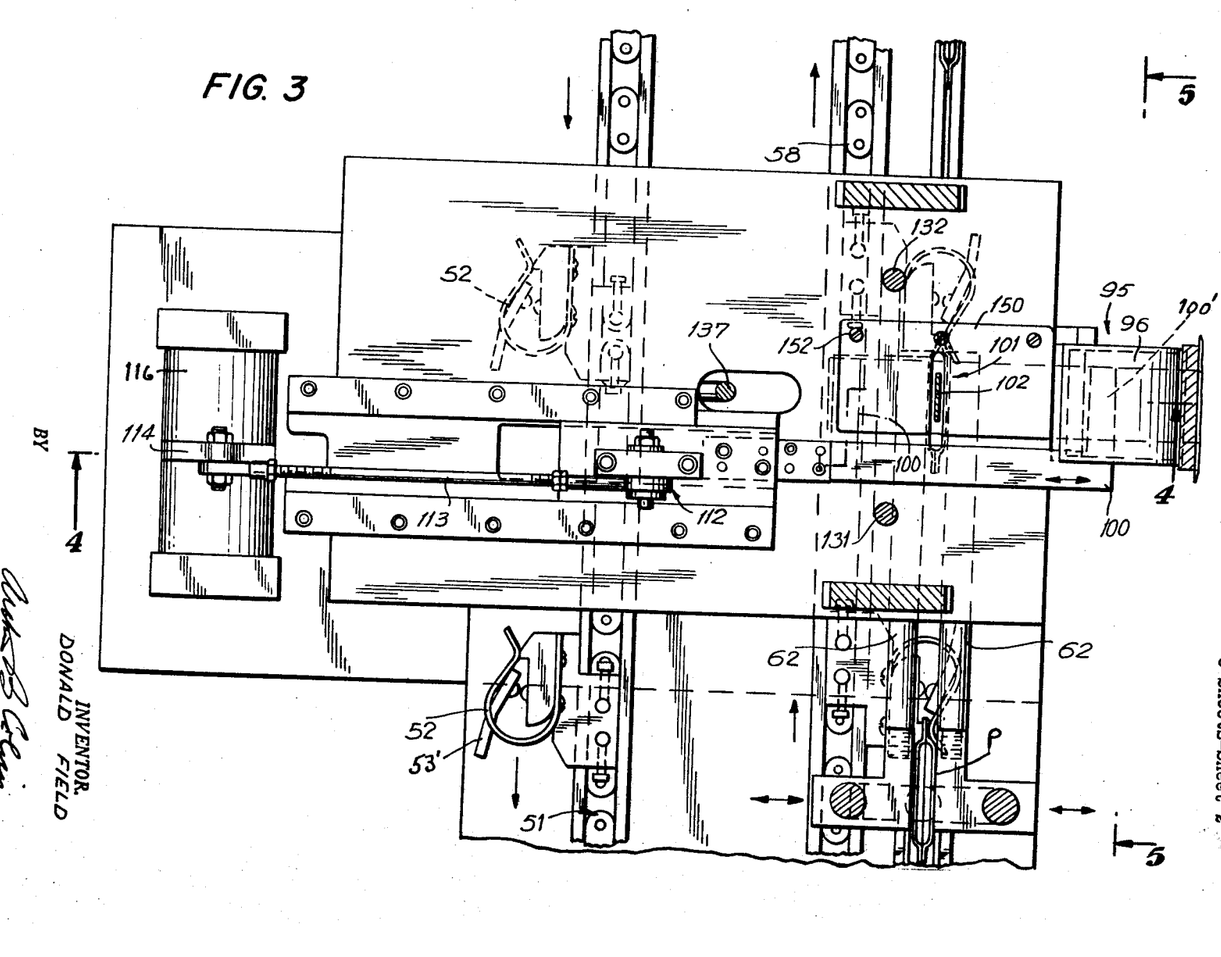
FIG. 3 is a detail plan view partly in section on an enlarged scale of the packet filling portions of the apparatus.
Figure 4:
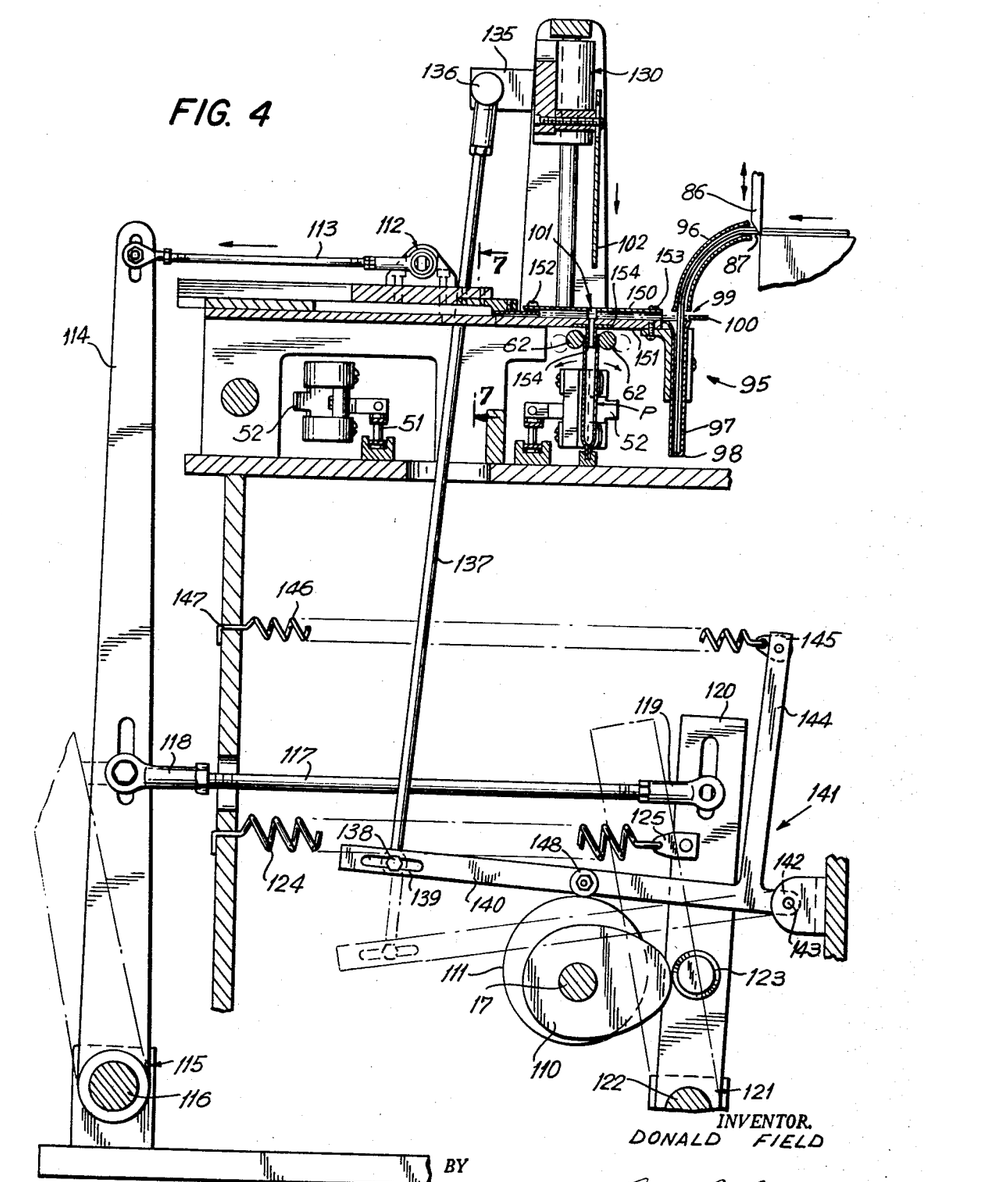
FIG. 4 is a section taken on the line 4—4 of FIG. 3.

The operation of the web processing apparatus is best illustrated in FIGS. 3, 4 and 5. This apparatus includes a blade or draw finger member 100 which draws the severed segments from the chute 95 and folds the same in half while positioning the same above the stuffer station 101, where the downwardly shiftable stuffer blade 102 engages the thus positioned, severed web member and forces the same downwardly through the station 101 into a packet which has been disposed beneath the station.

The folder blade 100 is activated through its horizontal range of movements and the stuffer blade 102 through its vertical range of movements by a mechanical actuator assembly which is best illustrated in FIG. 4.

To the main drive shaft 17 there are keyed, in side by side relation, folder blade operating cam 110 and stuffer blade operating cam 111. The folder blade 100 is affixed to a slide carriage 112 which is mounted for back and forth movement in a horizontal plane. The carriage 112 is connected by an adjustable push rod 113 to a pivotal link arm 114, the connections between the rod 113 and the arm 114 at one end, and the rod 113 and the carriage 112 at the other end permitting a range of pivotal movement of these parts.

The arm 114 is pivoted at 115 to a pivot pin 116 fixed to the frame. A draw bar 117 is pivotally mounted at its end 118 to a central portion of the arm 114, the opposite end 119 of the bar 117 being mounted to a swivel link 120. The swivel link 120, at its lower end 121, is carried by a horizontal pivot pin 122 fixed to the machine frame. An anti-friction follower member 123 is mounted on the link 120, the follower 123 being maintained in contact with the periphery of the eccentric cam 110 by draw spring 124 biased between the frame and a spring receiver 125 on the swivel link 120.

The stuffer blade 102 is carried by a stuffer carriage 130 mounted for vertical movement on vertically extending guide rods 131, 132. The blade 102 is vertically adjustable with respect to the carriage 130 by lock screws 133 which pass through slots 134 at the upper end of the blade 102.

To an offset arm 135 connected to the carriage 130 is pivotally mounted one end 136 of a draw bar 137, the lower end 138 of the draw bar 137 being pivotally connected adjacent an end 139 of one arm 140 of a bell crank lever 141. The bell crank lever 141 is pivotally mounted at 142 to a horizontally disposed pivot pin 143.

To the other arm 144 of the bell crank lever, adjacent the end 145 thereof, there is affixed a return spring 146, the opposite end 147 of the spring being secured to the frame. An anti-friction follower 148 is rotatably mounted substantially centrally of the arm 140 of the bell crank level 141, the spring 146 serving to bias the follower 148 against the periphery of the cam 111.

From the foregoing arrangement it will be evident that rotation of the shaft 17 carrying the eccentric 110, will, through the action of spring 124, cause the follower 123 to remain against the surface of the eccentric, thus shifting the draw bar 117 horizontally back and forth. This movement of the draw bar imparts back and forth pivotal movement to the arm 114 and, hence, to the folder blade carriage 112, which is connected to the arm. It will thus be observed that during each rotation of the shaft 17, the folder blade 100 will be shifted to the left from the position in which it is shown in FIG. 3, scanning the stuffer station, to the dot and dash or lefthandmost position shown in FIG. 3, and back again to the righthandmost position or solid line position in which it is shown in FIG. 3.

Similarly, the stuffer blade 102, which is shown in FIG. 4 in the uppermost position, will, during each rotation of the shaft 17, be shifted downwardly from its uppermost position (FIG. 4) to the depressed or stuffing position and returned to the original position in which it is shown in FIG. 4. The downward movement of the stuffer blade 102 results from the tension of the spring 146, which urges the follower 148 against the periphery of cam 111, it being understood that the lifting of the stuffer blade through draw bar 137 is effected by the upward force applied to the follower 148 by rise portions of the said cam 111.

As best seen in FIG. 4, the stuffer station 101 is defined by registering apertures formed in spaced-apart upper and lower plates 150, 151. The folder blade 100 rides, during its back and forth movement, between the noted plates, the spacing of the said plates being adjustable by spacer screws 152, 153. The spacing of the plates is important to the operation of the device, as will be amplified hereinafter.

A right angle member 154, FIG. 4, is disposed to either side of the stuffer station to form essentially a downward continuation of the slot in the lowermost plate 151. As best seen in FIG. 4, the downwardly directed arms of the right angle members 154 lie in inward lapping relation of the lips L of the packets, when the latter are disposed at the stuffing station.

The rods 62 move toward and away from the depending flanges of the right angle members 154 between the dot and dash and solid line positions shown in FIG. 4, the rods, in the inward position, outwardly lapping the lips L and maintaining the same adjacent the flanges of the members 154.

The operation of the filler portion 11 of the device will be evident from the foregoing description. Packet members formed in the section 10 of the apparatus are advanced in stop and start steps on the intermittently moving conveyer 51. As previously noted, the packets are puffed or inflated so as fully to distend the same at the puffer station 60, the clamp pads 65 serving to insure that a full distention, without air loss, may be achieved.

The distended packets are advanced by stages to a position beneath the stuffer station 101. At the same time as the packets are being advanced, an increment of filler web from the bulk supply 70 is advanced between drive rolls 73 and idler rolls 73' past the anvil or cutting station into the mouth of the curved upper portion 96 of the chute assembly 95. The increment of filler web will thus move through the upper portion 96 past the opening 99 into the bottom portion 97, the downward movement being restricted by the closed end 98 of the bottom portion 97. Thereupon, a controlled length of said web is severed by the knife 86. The web increments are timed in their introduction into the chute 95 so that the folder blade 100 has passed outwardly between the chute sections 96, 97 before the web enters into the lowermost section 97.

With the web in the lowermost section, the folder blade carriage 112 shifts to the left, as shown in FIG. 4, the thin blade member 100' engaging the filler web segment substantially medially thereof, and pulling the same between the spaced plates 150, 151, thus to fold the severed web in half.

The spacing between the plates 150, 151 is important to the operation of the device. The opposed surfaces of the noted plates should be spaced apart a distance sufficient to avoid forming a sharp crease at the lead edge of the filler segment as it is pulled between the said plates. This is in contrast to devices heretofore known, wherein efforts have been made to form a sharp fold at said edge. It has been determined that improved operation will result from a spacing of the plates which allows a rounded lead edge to be formed and does not bruise, crush or highly distort the fibers to retain substantially all of their resiliency. By this expedient, the still resilient fibers defining the fold tend to press the web areas against the upper and lower plates 150, 151 reducing the tendency of the filler segment to shift or back outwardly from between the plates with the return or outward movement of the folder blade 100.

A further factor which contributes to the prevention of the disorientation of the advanced and folded filler web segment is the relatively short extent of the folder blade 100 which, in contrast to the length of the folded web segment, is quite small. The use of a short length folder blade is in direct contrast to apparatuses heretofore known which include blades generally coextensive in length with the folded-in-half filler segments. Such lengthwisely extended folder blades were heretofore thought to be indispensible in achieving a withdrawal of the folder blade and were relied upon to obviate the necessity for disposing a free folder blade edge between the folded-in-half filler member during retractive movements of the blade.

The combination of plates, spaced apart in the manner aforesaid, and a short length of folder blade has been found unexpectedly to achieve the desirable result of minimizing instances of disorientation of the filler sheet.

With the filler sheet thus disposed above the stuffer station 101, the folder blade 100 will be shifted to the right and the stuffer blade 102 will be shifted downwardly through the registering apertures in the plates 150, 151, engaging the folded filler web segment and advancing the same through the stuffer station into the interior of a stationary packet on conveyor 51 which has already been disposed beneath the station.

In devices heretofore known, difficulties have been experienced in the course of stuffing, and in many instances rupture or distortion of the upper edges of the packet preform have occured. It should be borne in mind in this regard that the material of which the packets are formed, while relatively stiff, is nonetheless subject to distortion and if interposed in the way of the movement of the stuffer blade, a jamming of the blade or a puncture of the packets will result. By the novel expedient of stopping the side seals S short of the upper edge of the packet, leaving unconnected lips L, the aforementioned difficulties can be avoided. This is so since the lips L are disposed outwardly of the downwardly directed reinforcing flanges of the angle members 154 and the oscillating rods maintain the lips at this desired position so that the said lips will be rigidified during downward movement of the stuffer blade and substantially all tendencies toward deformation or rupture of the packets will be eliminated.

After performing its stuffing function, the blade 102 is withdrawn from the packet, the conveyor 51 restarts and the next packet in line is shifted to its position beneath the stuffing station. The stuffed packets emerging from the stuffer station are advanced to a conventional filler station 160 where the folded web filler members are saturated with any desired fluid. Thereafter the packets are advanced to a sealer station 161 which heat seals the lips L in a manner forming a continuation with the side seals S.

The completed packets then pass a cam release station 162', at which station they are simultaneously removed from the conveyor 51 by a suction device which deposits the completed packets on a further conveyor 162.

From the foregoing it will be observed that there is provided on improved packet forming device which is wholly mechanical in its operation, eliminating air valves, solenoids and air cylinders in the packet filling stations. The resultant device is thus rendered far more dependable and trouble-free than apparatus heretofore known and intended to perform the same function.

Various of the sub-assembles have been more or less diagrammatically illustrated for purposes of clarity, this being particularly true with respect to the various power takeoffs from the main shaft. However, since such power takeoffs are in all respects conventional, their operation will be evident to the skilled worker in the art and a more detailed disclosure is not considered necessary.

As many changes could be made in the above equipment and article, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Apparatus for forming a filled packet comprising in combination, means for forming open mouth envelopes, means for feeding said envelopes serially to a stuffer station, reciprocable draw finger means for shifting a pad segment along a first linear path to a position adjacent said stuffer station, stuffer blade means reciprocably shiftable through said stuffer station along a path angularly related to said first path for engaging and advancing said pad segment through said station into an envelope disposed adjacent said station, first and second lever means operatively connected to said draw finger means and blade means respectively, follower means on said first and second lever means, first and second cam means engaging said follower means of said first and second lever means, respectively, rotating shaft means keyed to said first and second cam means, and spring means yieldingly urging said follower means into contact with said cam means.

2. A device in accordance with claim 1 wherein said means for feeding said envelopes is intermittently activated, being stationary when said stuffer blade means is shifted through said stuffer station.

3. An apparatus for forming a sealed packet containing a fluid saturated pad, comprising means for forming an envelope having bottom and side seals and having an open mouth portion at the top, the side seals terminating short of the top of said envelope to define lip portions, means for advancing said envelopes sequentially in alternate stop and movement periods, elongated spreader means disposed between said lips, elongated gripper means moved toward said spreader means during said stop periods and away from said means during the movement periods cyclically to clamp and release substantially the entire length of said lips, a stuffer station in the path of said envelopes, stuffer blade means shiftable axially through said station into said mouth portion of said envelope during a stop period, said gripper means lying outwardly adjacent said lips when said envelopes are located at said station to define an outer re-enforcement for said lips, spaced means at said stuffing station defining an inner reinforcement for said lips against which the latter are retained by said gripping means to provide access for said stuffer blade into said envelope, liquid filler means for filling enevlopes leaving said stuffer station, and sealer means for sealing said lips.

4. An apparatus for forming a sealed packet containing a fluid saturated pad, comprising supply means for feeding a heat sealable material from a bulk supply, folder means for continuously folding said material in half about its longitudinal axis to provide juxtaposed side walls, heat sealer means for forming spaced apart side seals on said folded material, said side seals terminating in proximate spaced relation to the upper edges of said walls, to provide lip members adjacent said upper edges clear of any connection to each other, cutter means for severing envelope increments from said web by a cutting stroke coincident with said side seals, feed means for gripping and advancing said increments in a predetermined path in cyclical stop and start movements, spreader means disposed between said lip members as said increments are advanced by said feed means, laterally movable clamp means disposed parallel to each side of said spreader means for engagement with substantially the entire length of said lip members for pressing said lip members toward opposite sides of said spreader means during said stop periods and releasing said members during said start periods, puffer means on said spreader means for introducing air under pressure to the interior of said severed increments between said lip members while said lip members are pressed toward said spreader by said clamp means, thereby to expand said increments, a stuffer station, stuffer means for filling said expanded increments with a folded pad member, said stuffer means including a stuffer blade shiftable into and out of said increments through said lip members at said stuffer station, stationary guide means disposed inwardly adjacent said lip members when said increments are at said station, said clamp means pressing said lip members inwardly toward said guide means during movement of said stuffer blade into said increments, and releasing said lip members when said blade is clear of said increments, filler means for saturating said pad member, and final seal means for heat sealingly connecting said lip members to define a fully closed packet containing said saturated pad member.

References Cited

UNITED STATES PATENTS

| 2,745,583 | 5/1956 | Harker | 53—385 |
| 3,286,435 | 11/1966 | Weinberger | 53—117 |
| 1,909,050 | 5/1933 | Ferguson | 53—117 |
| 2,749,686 | 6/1956 | Lorenz et al. | |
| 3,262,349 | 7/1966 | Hollenton et al. | 53—51 |
| 2,649,674 | 8/1953 | Bartelt | 53—183 |

THERON E. CONDON, Primary Examiner

HORACE M. CULVER, Assistant Examiner

U.S. Cl. X.R.

53—120, 239